(12) United States Patent
Schell (10) Patent No.: US 6,233,210 B1
(45) Date of Patent: May 15, 2001

(54) OPTICAL DRIVE ERROR TRACKING METHOD AND APPARATUS

(75) Inventor: David L. Schell, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/169,368

(22) Filed: Oct. 9, 1998

(51) Int. Cl.[7] .................................................. G11B 7/13
(52) U.S. Cl. .................................... 369/44.41; 369/44.25; 369/44.28
(58) Field of Search ........................ 369/44.25, 44.27, 369/44.28, 44.29, 44.31, 44.32, 44.34, 44.35, 44.37, 44.41, 44.42, 112, 124.01, 124.12, 124.15

(56) References Cited

U.S. PATENT DOCUMENTS

| 5,138,593 | 8/1992 | Yokoyama | 369/44.29 |
|---|---|---|---|
| 5,138,594 | 8/1992 | Fennema et al. | 369/44.29 |
| 5,140,577 | * 8/1992 | Ohsato | 369/44.37 |
| 5,164,932 | 11/1992 | Fennema et al. | 369/44.29 |
| 5,329,508 | * 7/1994 | Matsueda | 369/44.34 X |
| 5,367,513 | 11/1994 | Bates et al. | 369/44.29 |
| 5,504,726 | 4/1996 | Semba | 369/44.28 |
| 5,642,341 | 6/1997 | Stork | 369/44.41 |
| 5,724,325 | 3/1998 | Jeong | 369/44.27 |

* cited by examiner

Primary Examiner—Muhammad Edun (57) ABSTRACT

A method and apparatus provides an improved optical storage disk player. An improved method and apparatus for obtaining a tracking error signal for an optical disk player is disclosed which is general across the various data formats found in CD audio disks, CD-ROMs, and digital video disks. The present invention uses a photodetector with at least four active areas to sense the reflected laser beam. A differential amplitude tracking error signal is generated by comparing the signal strength in the different active areas.

25 Claims, 7 Drawing Sheets

FIG. 3A
CD AUDIO INDIVIDUAL QUADS

FIG. 3B
CD AUDIO INDIVIDUAL QUADS

FIG. 3C
CD AUDIO DIFFERENTIAL PHASE SIGNALS

FIG. 4A
DVD VIDEO INDIVIDUAL QUADS

FIG. 4B
DVD VIDEO INDIVIDUAL QUADS

FIG. 4C
DVD VIDEO DIFFERENTIAL PHASE SIGNALS

FIG. 7
DVD VIDEO DIFFERENTIAL PHASE SIGNALS

—— DAT TES     - - - DPT TES

FIG. 8

OPTICAL DRIVE ERROR TRACKING METHOD AND APPARATUS

BACKGROUND OF THE INVENTION

1. Technical Field

The present invention relates generally to retrieving information from an optical disk. More specifically, the invention relates to a new method for generating a tracking error signal for any ablative, phase pit or phase change type of media such as compact disk (CD) or digital video disk (DVD). Still more specifically, the invention generates a tracking error signal by using a differential amplitude reading from a quad photodetector, or multiple pixel detector.

2. Description of Related Art

The use of optical disks for storing information has become popular in recent years and a number of products are commercially available, including compact audio disks, and digital video disks. Originally, these devices were read only memory devices, such as the music and personal computer CD players, but more recently, recordable compact disks have emerged in the marketplace. Despite the many different formats and options available in optical disk technology, there are considerable pressures to have standards which enable optical disk players to work with all data formats, and all manufacturers' products widely interchangable.

Figure 1:
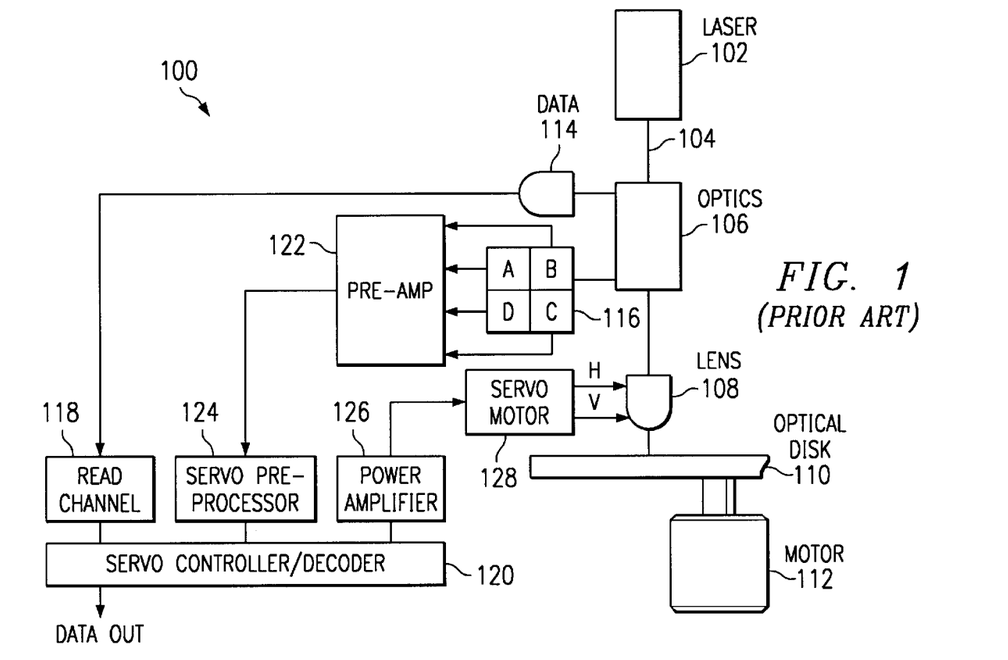
FIG. 1 is a block diagram schematic which illustrates the components and connections of a known optical disk system.

With reference now to the figures and in particular with reference to FIG. 1 is a block diagram schematic which illustrates the components and connections of a known optical disk player. This configuration is well known in the prior art and is included here to motivate and frame the present invention. An optical disk system 100 includes semiconductor diode laser 102 that is typically used to generate laser beam 104. Miniature optics 106 collimates and steers laser beam 104. Generally, a movable, controllable lens 108 focuses laser beam 104 to a focused spot, also referred to as beam spot, and position on a spinning optical storage disk 110, which is connected to a variable speed motor 112. Light reflected from optical storage disk 110 is routed to both detector 114 and a position sensitive detector, such as a quad photodetector 116. Detector 114 and quad photodetector 116 may be one single unit instead of the two units shown in FIG. 1 Electronic data for the data channel is routed through read channel 118 into a servo controller/decoder 120. The electronic signals from quad photodetector are routed through preamplifier 122, and a servo preprocessor 124, into servo controller/decoder 120. These electronics generate an error signal which, through a power amplifier 126 and servo control motor 128 adjust the position of lens 108 in the vertical and horizontal directions in order to keep laser beam 104 aligned in focus and on track.

Thus, these optical disk memory devices operate by bouncing light emitted from a semiconductor diode laser off an inhomogeneous reflective surface of a spinning optical disk. The reflected light is then routed to a detector, which outputs an electronic signal that is processed to recover the stored digital data. The laser beam is nominally stationary, however, the laser assembly is slid along the radius of the disk being read. Furthermore, fine adjustments of the beam focal spot and position are made based on a feedback signal that drives an electromechanical armature. The data is encoded on the disk in a variety of ways, including ablative, phase pit or phase change type of coding.

In general, the optical disk rotates, often at high speeds, and this gives rise to a time signal, or time vector of digital data. A single speed compact disk rotates at several hundred revolutions per minute (rpm). Because it is desirable to provide a constant time spacing between data readings, a constant linear velocity is maintained as the data is read from the disk. Thus the precise rotational speed depends on the portion of the disk being read. For example, typical rotational speeds for a single speed compact disk are 200 rpm at the outermost track and 450 rpm at the innermost track. Faster microprocessors, as well as an overall improvement in control technology, have enabled disk drives that operate at multiples of the original single speed CD player. Thus, a 6× (six times single speed) CD player rotates at speeds up to 2700 rpm when reading the innermost track. Advantages of higher speeds include shorter data acquisition time, and error checking for misread data points. At these faster operating speeds, optical beam alignment tolerances, and their error correction become more challenging. Further, it is highly desirable for any processing protocols, and error correction methods, to be general across all data formats.

In early optical disk readers, tracking was accomplished by advantageously coded spot patterns on the disk. This scheme is not widely used because it is an overly specific format, and valuable disk area is used for tracking instead of data storage.

One existing method for generating a tracking error signal for audio compact disks is the three spot tracking technique. Here, a tracking error signal generator includes three light receptors for receiving three optical signals reflected from a recorded medium and for generating respective three electrical output signals. The three light beams impinge upon the recorded medium along a line having a predetermined angle with respect to a recorded track. Thus, the outer two spots sandwich the inner, data reading spot, and line up with the inside and outside edges of the data track. The difference in power between the outer beams is compared to generate the tracking error signal. The tracking error signal is set to the difference between the first and third output signals. To be widely useful, it is desirable that digital video disk players be able to play compact disks. However, because there is a difference between the track pitch of the CD and that of the DVD, the three spot tracking technique is no longer suitable for generating error tracking signals which are independent of data format.

Differential phase tracking error overcomes the limitation of data format. To generate a differential phase tracking error signal which can be used to align the laser beam onto the data track of an optical disk, the quad photodetector 116 of FIG. 1 is used in the following manner. If the pit is left of the beam spot, the beam spot appears on quadrant A of quad photodetector 116 first and then on quadrant D. In this situation, the pit leaves quadrant A and then leaves quadrant D. The modulation of the output from these elements in quad photodetector 116 will have (quadrant A+quadrant C) ahead of (quadrant B+quadrant D) in the time domain. Measuring this phase difference provides a differential phase tracking error signal that may be used to drive servo control motor 128 in FIG. 1 to realign the laser beam onto the optical disk data track. A limitation of differential phase tracking error signal generation is that it is dependent on the specific data pattern, and hence proves to be more effective with certain formats than with others.

Therefore, it would be advantageous to have a method and apparatus for generating a tracking error signal that is robust across different data formats and is independent of data pattern.

SUMMARY OF THE INVENTION

The present invention uses a photodetector with at least four active areas to sense the reflected laser beam. A differential amplitude tracking error signal is generated by comparing the signal strength in the different active area. In a preferred embodiment of the present invention, a quad photodetector is used to detect reflections from a spot generated by a laser beam directed onto a surface containing optical data. In this example, the signals from the diagonal elements of the quad cell are summed. These sums are then fed through differential amplifier circuitry. Sample and hold circuitry is used to form a suitable tracking error signal. Additional circuitry and filtering algorithms can be used to extend and improve the technique where necessary and justified. For example, a position photodetector with more than four elements will give information on beam shape, astigmatism or ellipticity, which may then be used to recollimate or refocus the laser beam. Since the differential amplitude tracking error signal is somewhat dependent on overall signal strength, the laser power may be monitored, through amplitude peak detection, quad sum monitoring, or back facet sampling for examples. The quad signals may then be normalized by this power level measurement to reduce the dependence on signal amplitude.

BRIEF DESCRIPTION OF THE DRAWINGS

The present invention and its features and advantages, herein described or otherwise apparent, may be better understood by reference to the following description in conjunction with the appended drawings, which drawings form a part of this specification. It is noted, however, that the appended drawings illustrate only exemplary embodiments of the invention and are therefore not to be considered limiting of its scope.

DETAILED DESCRIPTION OF THE PREFERRED EMBODIMENT

The present invention provides an improved optical storage disk player. An improved method and apparatus for obtaining a tracking error signal for an optical disk player is disclosed which is general across the various data formats found in CD audio disks, CD-ROM, and digital video disks. Differences in data formats include different track spacings, size and shape of features, quality, or uniformity of recording, and type of format, including ablative, phase pit or phase change type of coding. The processes and circuits described below may be implemented within an optical disk system, such as optical disk system 100 in FIG. 1.

When an edge of a pit is scanned by an optical spot in a disk drive, the reflective pattern that is observed by the quad detector will be a function where the pit is located relative to the center of the spot. When the pit is passed through the center of the spot, the diagonal quad photodetectors will see the same intensity patterns. The difference between the diagonal ((1a+1c)−(1b+1d) will equal zero. If the pit is scanned down one side of the spot, one side of the diagonals in the quad photodetectors will see the pit first while the second set of diagonals will see the pit later. The present invention generates a differential amplitude tracking (DAT error signal) by sampling the amplitude difference between the diagonal pairs of quad signals when the sum signal passes through the mid amplitude point in either direction. This midpoint is at the edge points of any pit. The processes and circuit used to generate the DAT signal are described in more detail below.

Figure 2A:
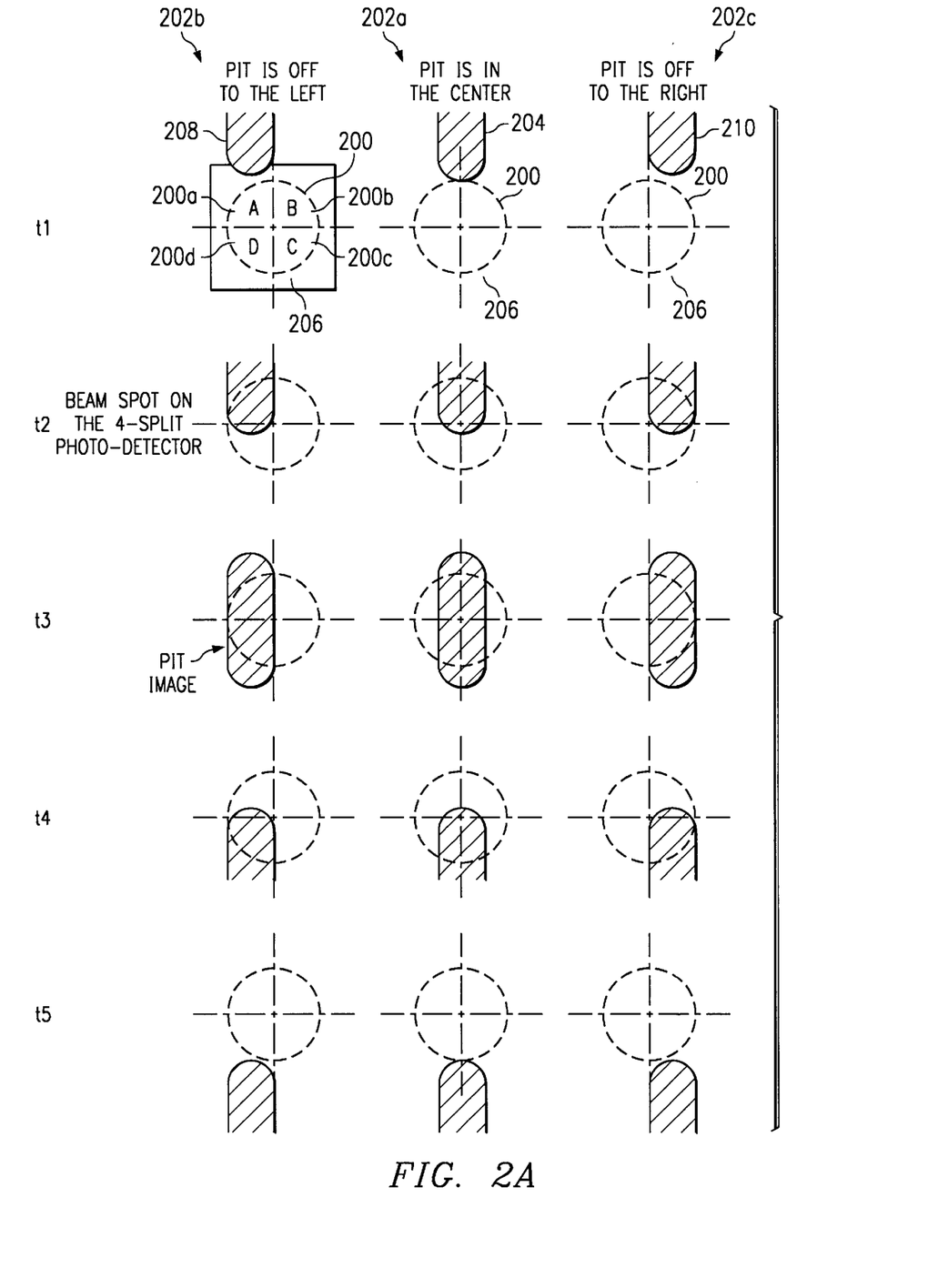
FIG. 2 is and illustration of pit positioning relative to beam spots for a quad photodetector and outputs for the photodetector in accordance with a preferred embodiment of the present invention.
Figure 2B:
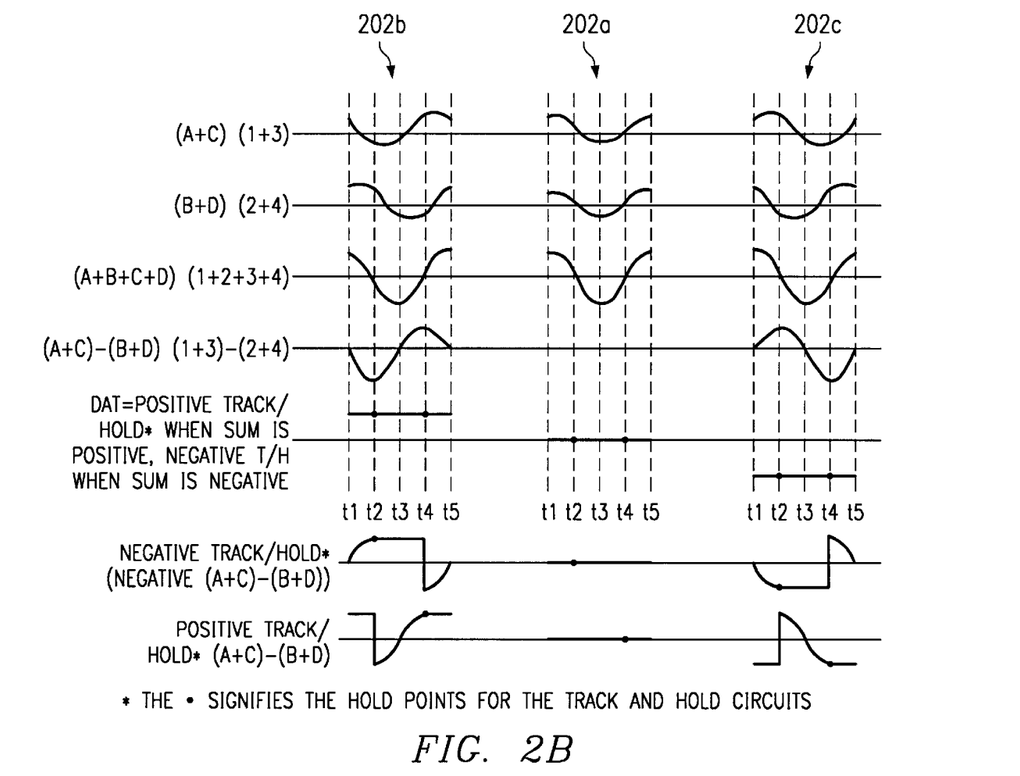

Referring now to FIGS. 2A and 2B, pit positioning relative to beam spots for a quad photodetector and outputs for the photodetector is illustrated in accordance with a preferred embodiment of the present invention. A top view of a 2×2 sensor or quad photodetector 200 and position light beam 206 for three cases of alignment of a laser beam spot relative to pits in an optical storage track is depicted in accordance with a preferred embodiment of the present invention. Quad photodetector 200 has sensors or active regions in the depicted example. These regions are also referred to as "quadrants". In section 202a in FIG. 2A, pit 204 is located at the center of beam spot 206 on quad photodetector 200, which has active regions 200a, 200b, 200c, and 200d. Each of the active regions generates a signal having an amplitude with signal A being generated by active element 200a, signal B being generated by active element 200b, signal C beam generated by active element 200c, and signal D being generated by active element 200d. The relation between beam spot 206 and pit 204 are shown for times t1 through t5 in case 202a in FIG. 2A. Also shown in case 202a in FIG. 2B are photodetector outputs or signal strengths from the four split photodetector for various combinations of quadrants for times t1 through t5. In the depicted examples, graphs of DAT, negative track/hold, and positive track/hold are shown. DAT is positive when pit 208 is left of spot 206 and DAT is negative when pit 210 is right of spot 206. In case 202a, DAT is zero. The same is true for negative track/hold and positive track/hold graphs. In case 202b, pit 208 is positioned off to the left of beam spot 206. Photodetector outputs are shown for the various quadrants along with DAT, negative track/hold, and positive track/hold graphs for the situation in which the pit is off to the left of a beam spot. In case 202c, pit 210 is located off to the right of beam spot 206. Corresponding photodetector outputs various combinations of quadrants are shown for this particular situation for times t1 through t5. As with the other pit positions in cases 202a and 202b, DAT, negative track/hold, and positive track/hold graphs are depicted.

In one embodiment of the present invention, the electronic signals from active elements 200a, 200b, 200c, and 200d in quad photodetector 200 are summed. In FIG. 2B, the diagonal sum signals are (A+C) and (B+D). In the circuitry and method of the present invention, the time varying amplitudes of these signals from the active elements are compared to generate an error signal. In case 202a in FIG. 2A, the beam spot from the laser beam is well aligned to the track and the sum diagonal signals are identical as a function of time. The laser beam is misaligned to the left in case 202b and to the right in case 202c. In the present invention, the amplitudes of the sum diagonal signals in these cases are compared to give a correction signal which returns the laser beam into alignment as shown in case 202a.

Depending upon the implementation, the position sensor light detector may include more than 2×2 elements. For example, 3×3, 4×4, 2×3 or 2×4 elements may be employed. In these instances, the additional data available may be used for beam spot astigmatism or ellipticity correction, for faster tracking correction, or for more precise tracking correction.

Figure 3A:
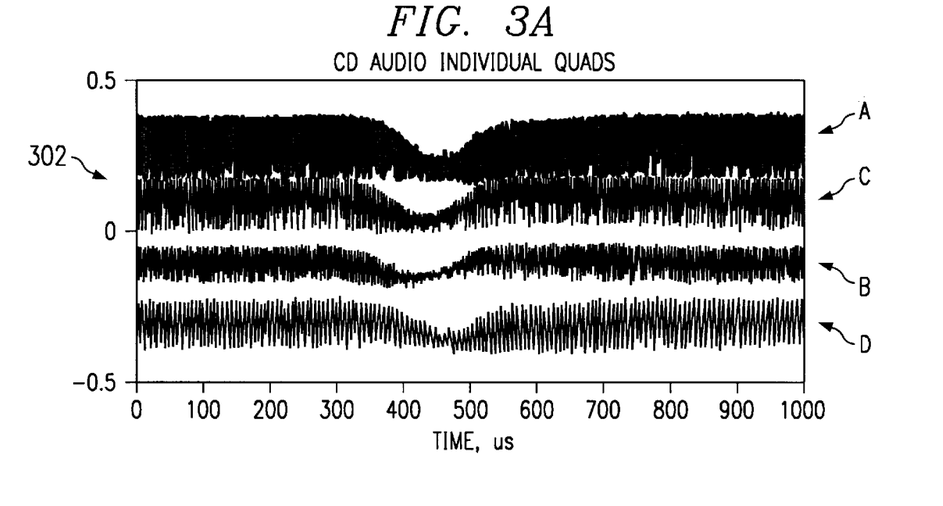
FIG. 3 are graphs of examples of time data traces for quad photodetector signals in a compact disk application.
Figure 3B:
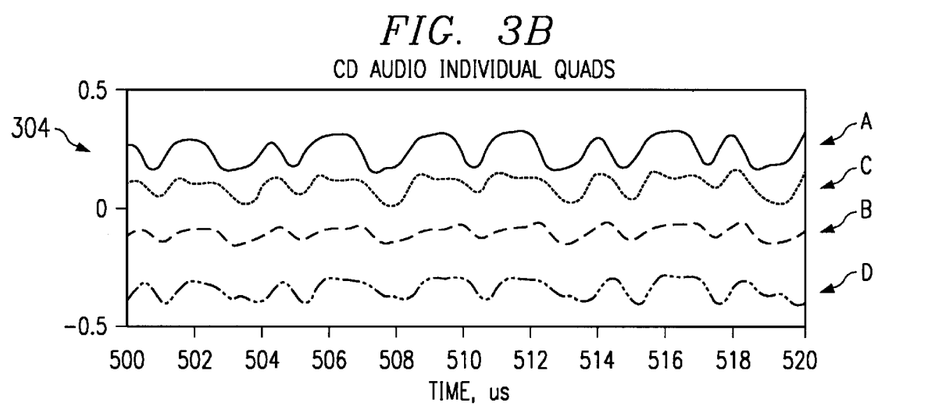
Figure 3C:
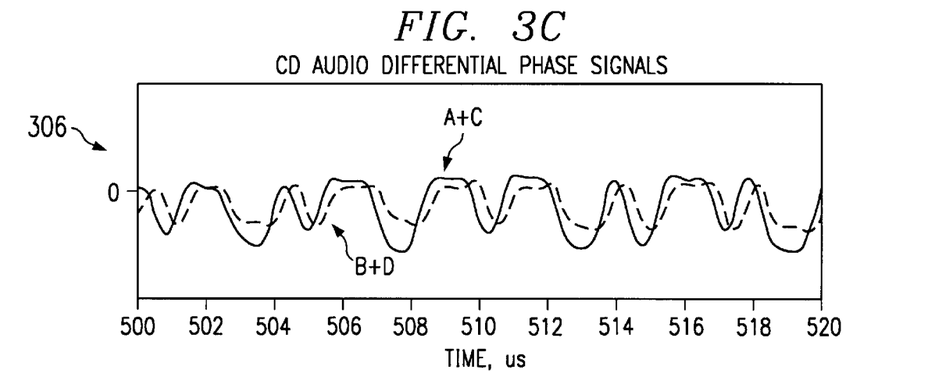

FIG. 3 are examples of time data traces for quad photodetectors signals in a compact disk application is depicted in accordance with a preferred embodiment of the present invention. Graph 302 shows long term behavior of signals A, B, C and D, as the signal level goes through a minimum by doing a one track seek. Graph 304 shows the same data in the region of the minimum on an expanded horizontal scale. Graph 306 is shown the diagonal sum signals (A+C) and (B+D).

Figure 4A:
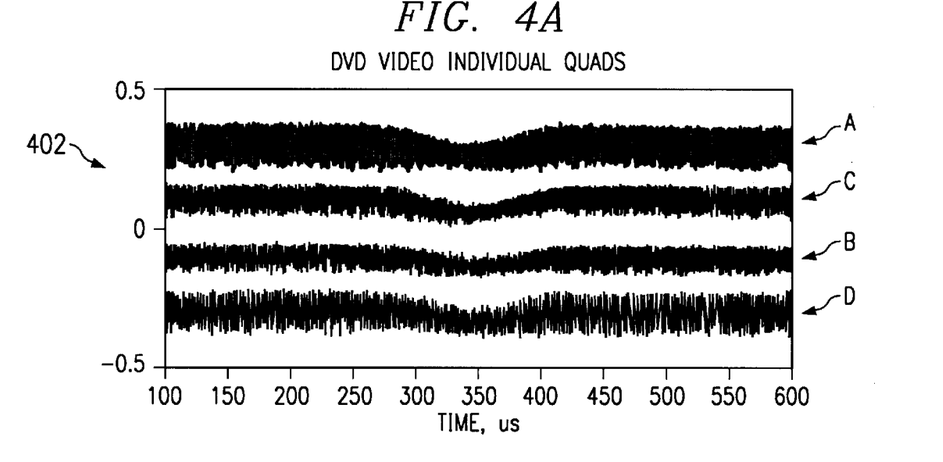
FIG. 4 are graphs of examples of time data traces for quad photodetector signals in a digital video disk application.
Figure 4B:
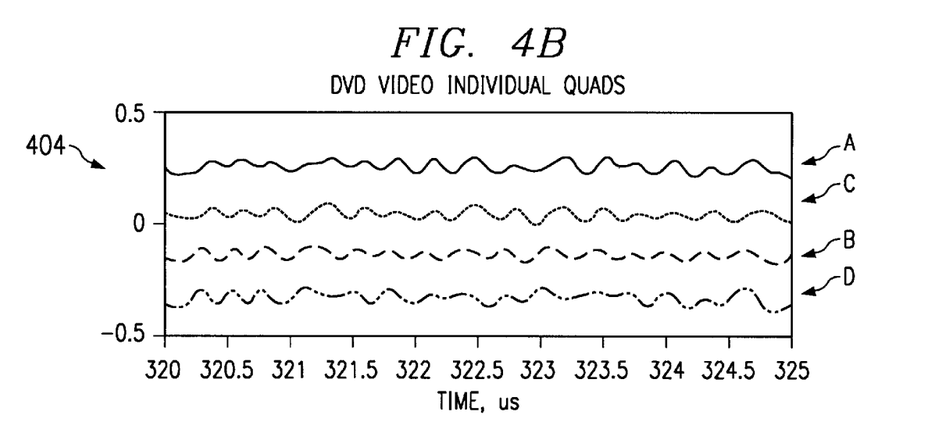
Figure 4C:
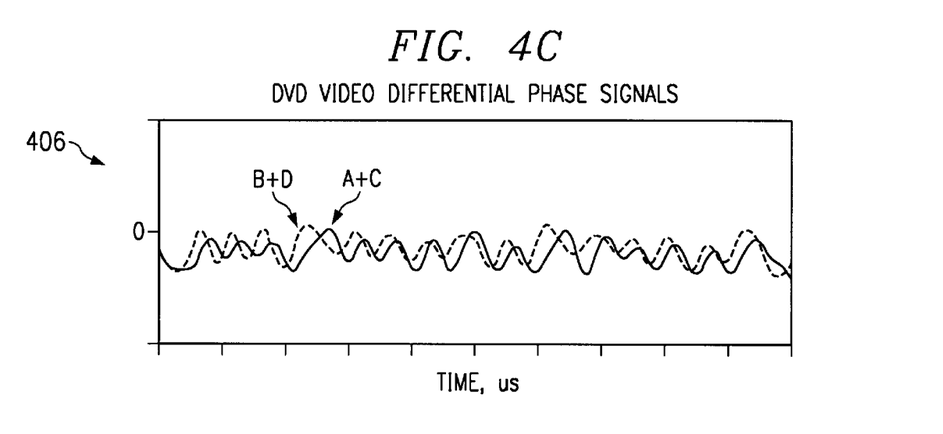

With reference next to FIG. 4, example time data traces for quad photodetectors signals in a digital video disk (DVD) application are depicted in accordance with a preferred embodiment of the present invention. Graph 402 shows long term behavior of signals A, B, C, and D from active elements 202a, 202b, 202c, and 202d, respectively, as the signal level goes through a minimum by doing a one track seek. Graph 404 shows the same data in the region of the minimum on an expanded horizontal scale. Graph 406 is shown the diagonal sum signals, (A+C) and (B+D).

Figure 5:
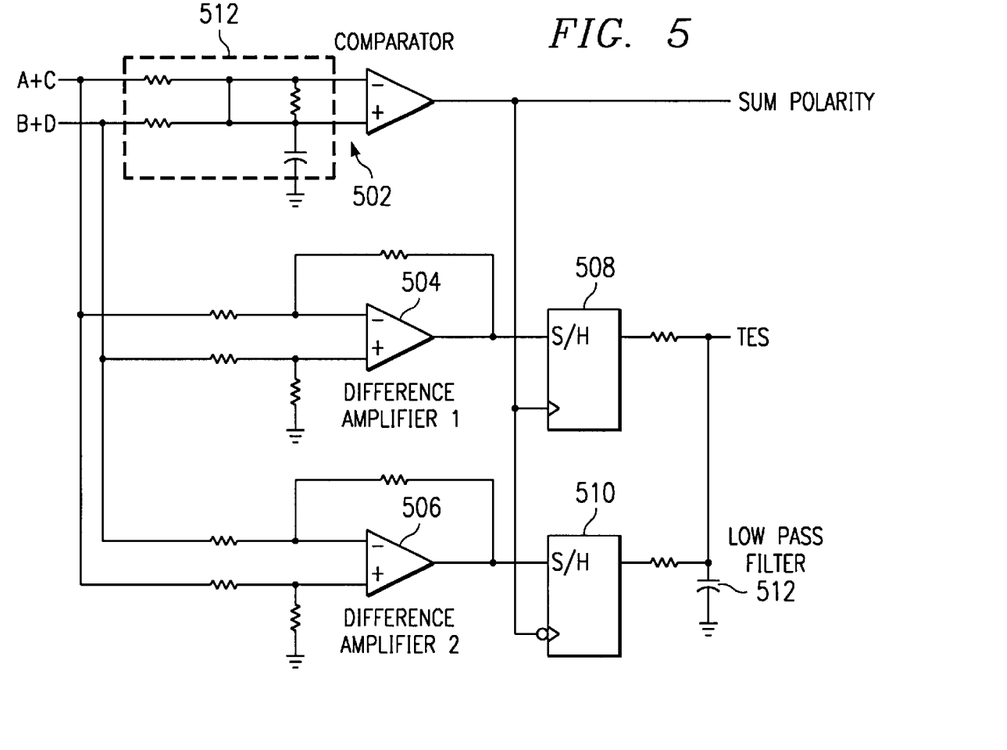
FIG. 5 is a circuit schematic of a preferred embodiment for processing a differential amplitude tracking error signal.

Turning next to FIG. 5, a circuit schematic of a differential amplitude tracking error signal circuit for an optical storage disk reader is depicted in accordance with a preferred embodiment of the present invention. In the depicted example, a comparator circuit 502 is coupled in parallel with two differential amplifiers 504 and 506. These amplifiers are connected to sample and hold circuitry 508 and sample and hold circuitry 510. Filtering circuitry 512 is included at the final stage, and may be distributed throughout the circuit.

In operation, the electronic signals from the quad photodetector 116 diagonals, A and C are summed, and the electronic signals from the quad photodetector 116 diagonals, B and D are summed and comprise the input to the circuit of FIG. 5. Signals from the active elements (A+C) and (B+D) are routed to comparator circuit 502 to generate a sum polarity signal which enables, or triggers the sample and hold circuitry 508 or sample and hold circuitry 510 depending on the polarity of the comparator output. In parallel, signals (A+C) and (B+D) are routed to differential amplifier 504 and differential amplifier 506 in reciprocal manner so that the diagonal sum signal in the positive input of one differential amplifier is the negative input of the other differential amplifier. It in one embodiment of present invention, these components may be implemented using wide bandwidth video differential amplifiers integrated with a sample and hold circuit. The outputs of the differential amplifiers are inputs to triggered sample and hold circuits. The outputs of the sample and hold stages are tied together and filtered to form the differential amplitude tracking (DAT) error signal. This DAT error signal is used to control a servo in the optical disk system to bring the spot generated by the laser beam back to the center of the quad photodetector that indicates that the aligmnent is back on the track of the optical storage disk.

A mathematical formulation of the operation of the circuit is useful in further explaining the DAT error signal generated in accordance with a preferred embodiment of the present invention. The signals from the four diagonals, A, B, C and D, in the quad photodetector are summed and low pass filtered to produce a FilterSum signal as a function of time. For example without limitation this formula may be written in discrete time form as, $$\text{FilterSum}[n]=[\text{FilterSum}[n-1]*(t_c-1)+A[n]+B[n]+C[n]+D[n]]/t_c$$

This FilterSum signal is routed into a comparator that may be modeled by the output SumPolarity signal, $$\text{SumPolarity}[n]=1 \text{ if } A[n]+B[n]+C[n]+D[n]>\text{FilterSum}[n]$$

and $$\text{SumPolarity}[n]=-1 \text{ if } A[n]+B[n]+C[n]+D[n]\leq\text{FilterSum}[n]$$

This SumPolarity signal triggers the sample and hold circuitry. So long as this SumPolarity signal is unchanged, the differential amplitude tracking error signal will remain unchanged. If the SumPolarity signal has changed, then the differential amplitude tracking error signal will change to a value proportional to the strength of (A+C)−(B+D), the difference between the diagonal components. If the SumPolarity signal changes from negative to positive then the differential amplitude tracking error signal will be proportional to the negative of (A+C)−(B+D). If this SumPolarity signal changes from positive to negative, the differential amplitude tracking error signal will be proportional to (A+C)−(B+D). Otherwise, the DAT signal is held. Mathematically, this condition for DATES, the differential amplitude tracking error signal, may be written, for example, as $$\text{DATES}[n]=[(A[n]+C[n])-(B[n]+D[n])] \text{ if SumPolarity}[n]>0 \text{ and SumPolarity}[n] \text{ SumPolarity}[n-1]$$

else $$\text{DATES}[n]=[(A[n]+C[n])-(B[n]+D[n])] \text{ if SumPolarity}[n]<0 \text{ and SumPolarity}[n] \text{ SumPolarity}[n-1]$$

else $$\text{DATES}[n]=\text{DATES}[n-1]$$

In general, the DATES signal will be low pass filtered. For example, without limitation this formula for the low pass DATES, LPDATES, may be written in discrete time form as, $$\text{LPDATES}[n]=+e\text{,}fra\ 1/t_c+ee\ \{\text{DATES}[n]+(\text{LPDATES}[n-1](t_c-1))\}$$

It will be evident that this mathematical description may be implemented using analog electronics, digital electronics, in a digital filter, a digital signal processor, or in any other functional algorithmic method, or in any mixture of these formats.

Figure 6:
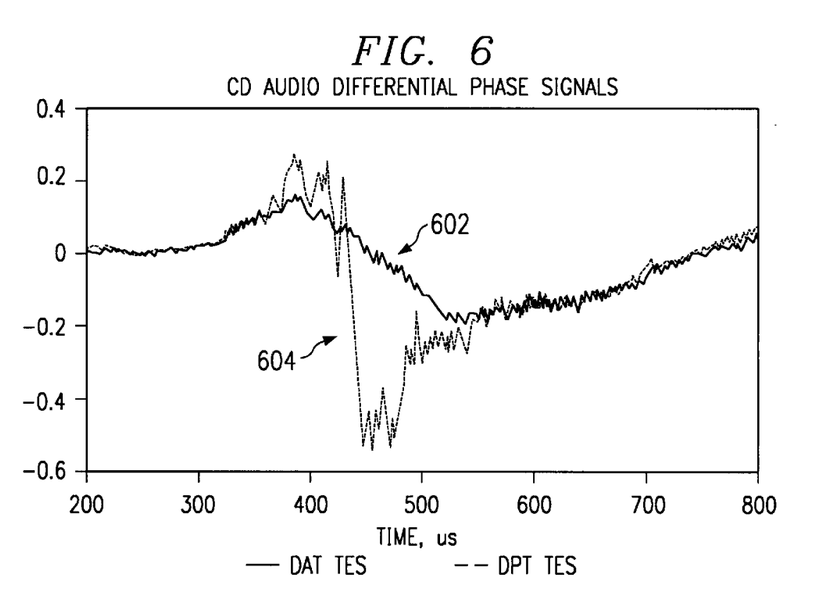
FIG. 6 is a graph of tracking error signals for compact disk data.

Turning next to FIG. 6, a graph of differential amplitude tracking error signal 602 during a one track seek of the present invention for the compact disk data of FIG. 3 and a graph of differential phase tracking error signal 604 of prior art for the same data. It will be evident to those skilled in the art that the read laser beam alignment servo motor will track in a similar manner when either signal is applied.

Figure 7:
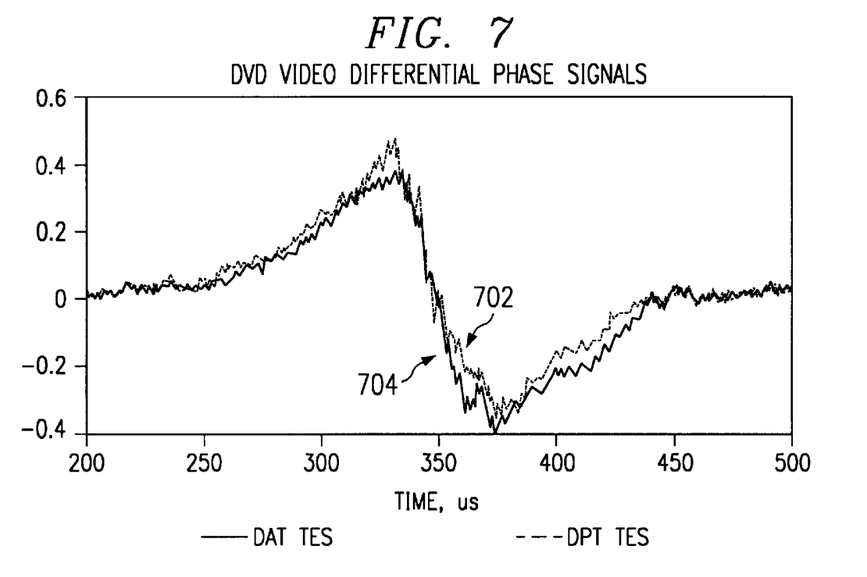
FIG. 7 is a graph of tracking error signals for digital video disk data.

With reference now to FIG. 7, a graph of differential amplitude tracking error signal 702 during a one track seek of the present invention for the digital video disk data of FIG. 4 and a graph of differential phase tracking error signal 704 of prior art for the same data. It will be evident to those skilled in the art that the read laser beam alignment servo motor will track in a similar manner when either signal is applied.

Figure 8:
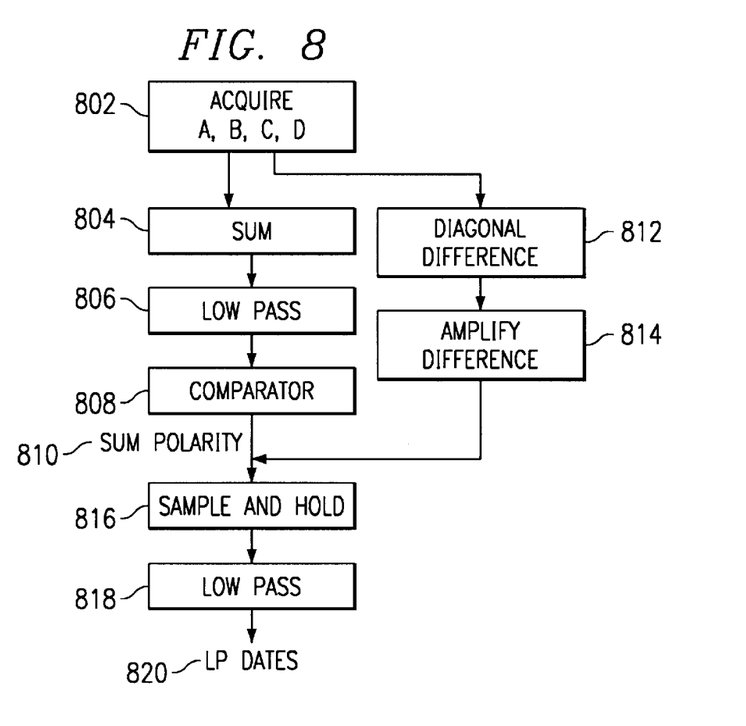
FIG. 8 is a simplified machine operations chart showing a method of generating a differential amplitude tracking error signal.

Turning next to FIG. 8, a simplified machine operations flowchart showing a process for generating a differential amplitude tracking error signal is depicted in accordance with a preferred embodiment of the present invention. The flowchart assumes a starting point at the quad photodetector 116. The quad photodetector data is acquired (step 802) summed (step 804) and filtered (step 806). The filtered signal is compared to its past average value (step 808) to ascertain the polarity of the sum signal. The result is the SumPolarity signal (step 810). To ascertain the magnitude of the servo signal, the differences of the diagonal elements of the quad photodetector are determined (step 812). These differences are amplified (step 814) and sent to a sample and hold (step 816). This difference data is sampled when SumPolarity signal 810 determined in step 810 changes in step 816. Low pass filtering is performed (step 818) in order to generate the differential amplitude tracking error signal, LPDATES (step 820).

Figure 9:
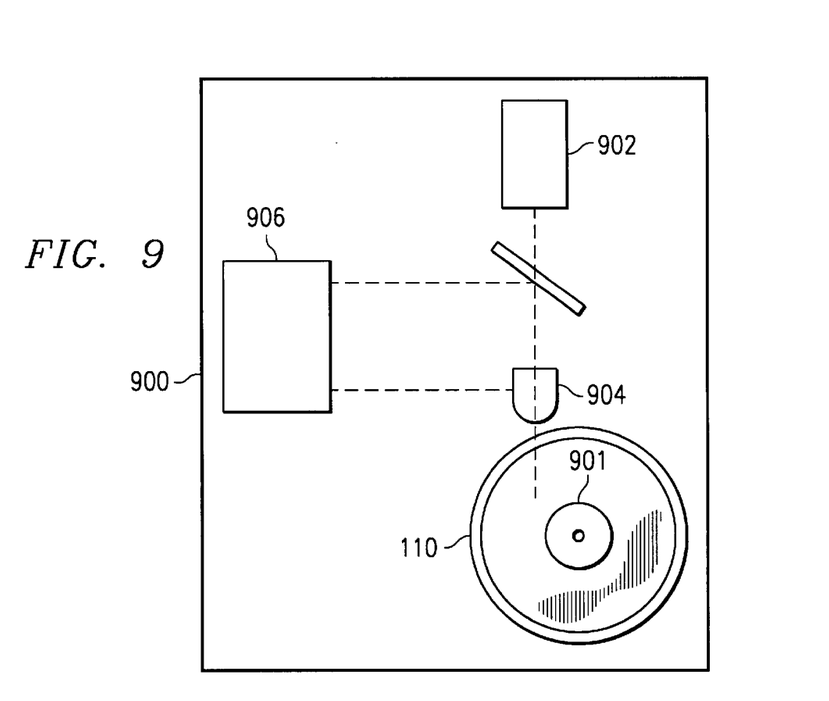
FIG. 9 is a system schematic showing the use of the differential amplitude tracking error signal device or method in a optical storage disk read system.

In FIG. 9, a system schematic showing the use of the differential amplitude tracking error signal device or method in an optical storage disk read system 900 in accordance with a preferred embodiment of the present invention. In optical storage read disk system 900, optical disk 110 is supported and rotated by spindle motor 901. A beam spot is formed by light focus on optical disk 110 from laser and optics 902. Adjustable steering device 904 is used to adjust the light beam from laser and optics 902. Laser and optics 902. The adjustment mechanism of the adjustable steering device 904 is connected to the error generating digital or analog electronics 906 also includes a sensor for detecting reflections from the beam spot formed on optical disk 110. Included in the error generating electronics 906 may be circuitry similar to that shown in FIG. 5, or a digital signal processor implementation of a process similar to that shown in FIG. 8.

Thus, the present invention provides an improved method and apparatus for generating an error signal in a optical disk system. The present invention provides this advantage through the generation of a DAT error signal that is used for any ablative phase pit or phase change type of media, such as CD and DVD media. In the depicted example, this DAT error signal is generated using a quad photodetector. The DAT error signal generated by the present invention provides an error signal that is independent of the data pattern on the optical media.

Further modifications and alternative embodiments of this invention will be apparent to those skilled in the art in view of this description, but is not limited to be exhaustive or limited to the invention in the form disclosed. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. An electronic circuit for generating a tracking error signal for an optical storage disk, the electronic circuit comprising:

a position sensitive optical detector with a plurality of active regions, wherein the plurality of active regions generates a plurality of signals in which each signal within the plurality of signals is a signal strength;

comparing means for comparing the signal strength from each of the plurality of active regions; and generation means for generating a differential amplitude tracking error signal based on a comparison of signal strengths of diagonally positioned signals from the plurality of active regions.

2. The electronic circuit of claim 1 where the position sensitive optical detector is a quad photodetector.

3. The electronic circuit of claim 1, wherein the plurality of active regions includes at least four active regions.

4. The electronic circuit of claim 1 where the electronic circuit is an analog electronic circuit.

5. The electronic circuit of claim 1 wherein the electronic circuit is a mixture of analog and digital electronics.

6. The electronic circuit of claim 1 wherein the means for comparing the signal strength in the active regions includes at least one differential amplifier.

7. The electronic circuit of claim 6 wherein output signals of the differential amplifiers are connected to triggerable sample and hold circuits.

8. The electronic circuit of claim 7 wherein the trigger signal for the triggable sample and hold circuits is a SumPolarity signal.

9. An optical storage disk system comprising:

support means for supporting an optical disk having a plurality of tracks for storing data;

an optical head associated with the support means, wherein the optical head includes a light source;

an object lens for focusing light from the light source to form a beam spot onto a selected tack for the optical disk;

an optical system associated with the object lens, the light source and the optical disk, the optical system directing light emitted by the light source to the object lens and receiving an image of a beam spot reflected from the optical disk and directing same to a light receiver, the light receiver producing an output signal indicative of the reflected image of the light beam spot;

focusing and tracking actuators associated with the object lens, the focusing actuator being controllable, by a tracking error signal, for moving the object lens and correspondingly the focused light beam spot into alignment with the tracks on the optical storage disk; and a differential amplitude tracking error signal generated by an electronic circuit generating a differential amplitude tracking error signal.

10. The optical storage disk system of claim 9, wherein the light receiver producing an output signal indicative of the reflected image of the light beam spot is a position sensitive optical detector with at least four active regions.

11. The optical storage disk system of claim 10 wherein amplitudes of the signals from diagonal elements of the position sensitive optical photodetector are differentially amplified and compared.

12. The optical storage disk system of claim 9, wherein the electronic circuit has both analog and digital circuitry.

13. An electronic system including an optical storage disk read apparatus, the electronic system comprising:

an electronic circuit for generating a differential amplitude tracking error signal for an optical storage disk, the electronic circuit comprising:

a position sensitive optical detector with at least four active regions;

comparing means for comparing a signal strength in the active regions; and signal generation means for generating a differential amplitude tracking error signal in response to a comparison of the signal strength in the active region.

14. The electronic system of claim 13, wherein the position sensitive optical photodetector is a quad photodetector.

15. The electronic system of claim 13, wherein the electronic circuit is an analog electronic circuit.

16. The electronic system of claim 13, wherein the electronic circuit is a mixture of analog and digital electronics.

17. The electronic system of claim 13, wherein the comparing means includes a differential amplifier.

18. The electronic system of claim 17, wherein an output signal of the differential amplifier is connected to a triggerable sample and hold circuit.

19. The electronic system of claim 18, wherein the trigger signal for the triggerable sample and hold circuit is a SumPolarity signal.

20. A method for generating a tracking error signal for an optical disk having a plurality of tracks in which each track within the plurality of tracks includes pits, the method comprising:

focusing light on a track within the plurality of tracks, wherein a focused spot is formed on the track and passes over pits within the plurality of tracks;

detecting a reflection of light from the focused spot as the focused spot passes over pits at a detector having a plurality of active regions, wherein a plurality of signals is generated by the plurality of active regions detecting the reflection of light from the focused spot and wherein each of the plirality of signals has an amplitude;

comparing the amplitude for each of the plurality of signals; and generating a differential amplitude tracking error signal based on comparing the amplitude for each of the plurality of signals.

21. The method of claim 20, wherein the plurality of active regions is four.

22. The method of claim 20, wherein the optical disk is a CD-ROM.

23. The method of claim 20, wherein the optical disk is a digital video disk.

24. The method of claim 20, wherein the plurality of active regions are located within a quad photodetector.

25. An optical storage system comprising:

a spindle motor configured for supporting and holding an optical disk;

a light and optics unit, wherein the light and optics unit generates a light beam that forms a focused spot on the optical disk;

a steering device connected to the light and optics unit, wherein the steering device steers the light beam generated by the light and optics unit, controlling a location of the focused spot on the optical disk;

an error generation device connected to the steering device, wherein the error generation device includes:

a sensor having a plurality of active areas, wherein the plurality of active areas generates a plurality of signals in response to detecting a reflection of light from the focused spot formed on the optical disk in which each of the plurality of signals is an amplitude;

comparison means for comparing the amplitude for each of the plurality of signals; and error signal generation means for generating a differential amplitude tracking error signal based on the comparison of the amplitude for each of the plurality of signals, wherein the steering device uses the differential amplitude tracking error signal to steer the light beam.

* * * * *